June 3, 1958 R. E. BALDWIN 2,837,280
RECORD CONTROLLED STATISTICAL MACHINES
Filed Sept. 2, 1955 7 Sheets-Sheet 1

Inventor
RICHARD E. BALDWIN
By

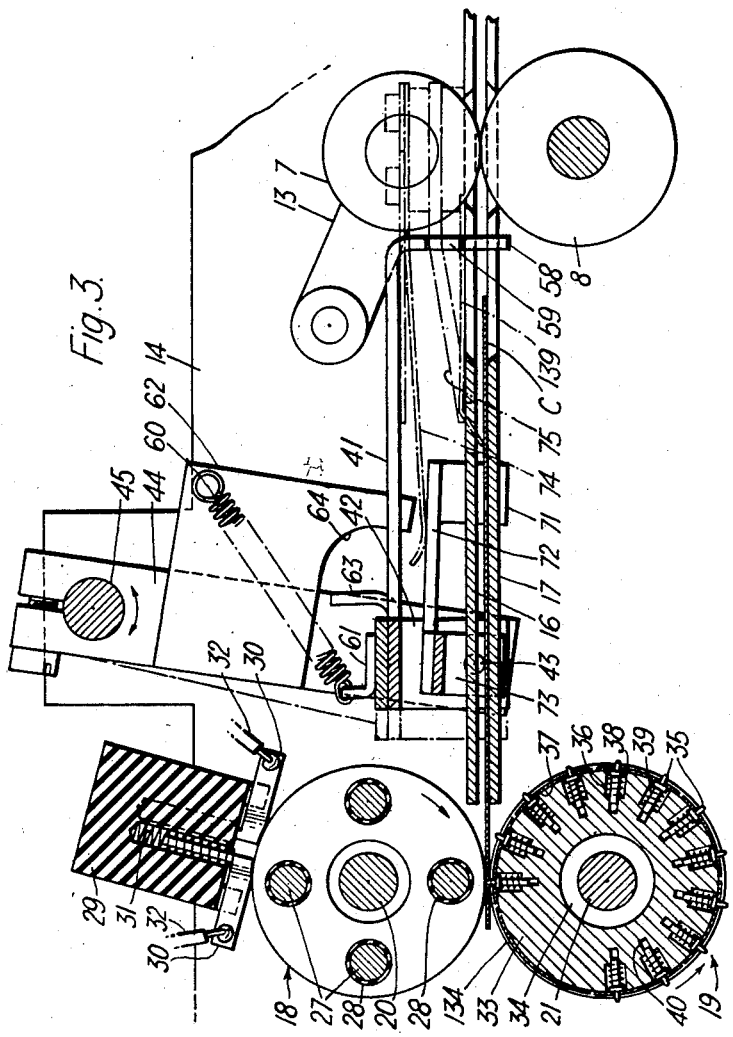

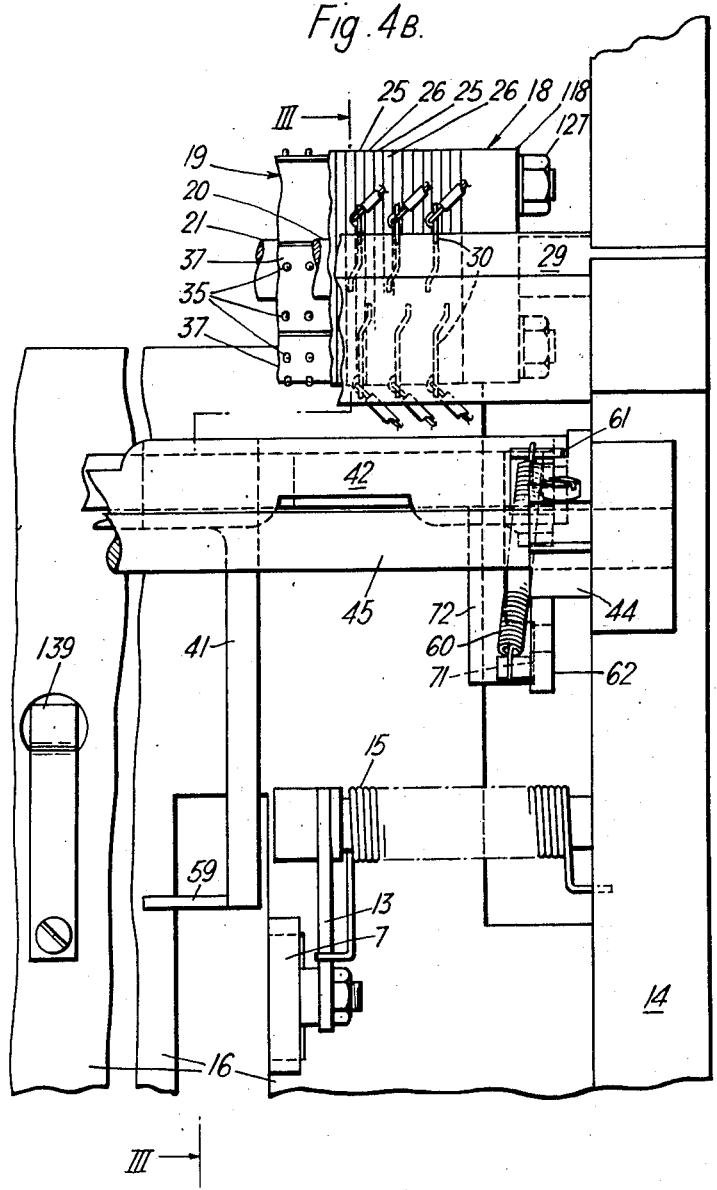

June 3, 1958   R. E. BALDWIN   2,837,280
RECORD CONTROLLED STATISTICAL MACHINES
Filed Sept. 2, 1955   7 Sheets-Sheet 5

Inventor
RICHARD E. BALDWIN
By
Attorney

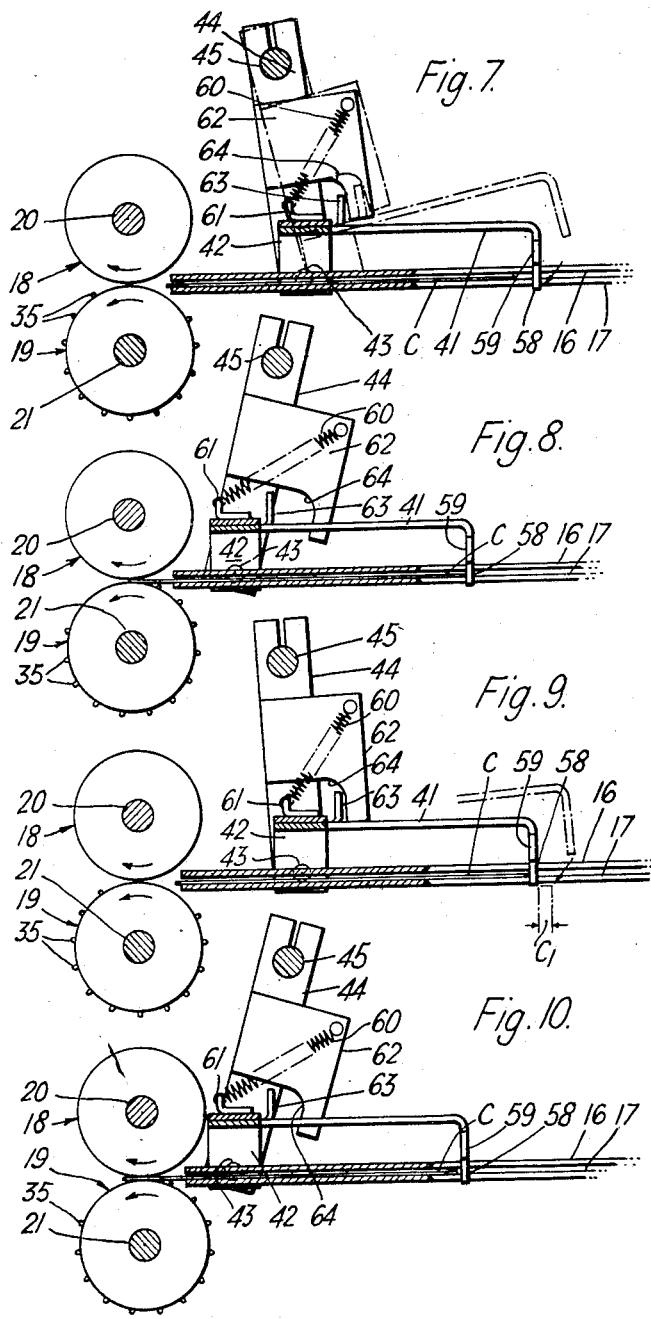

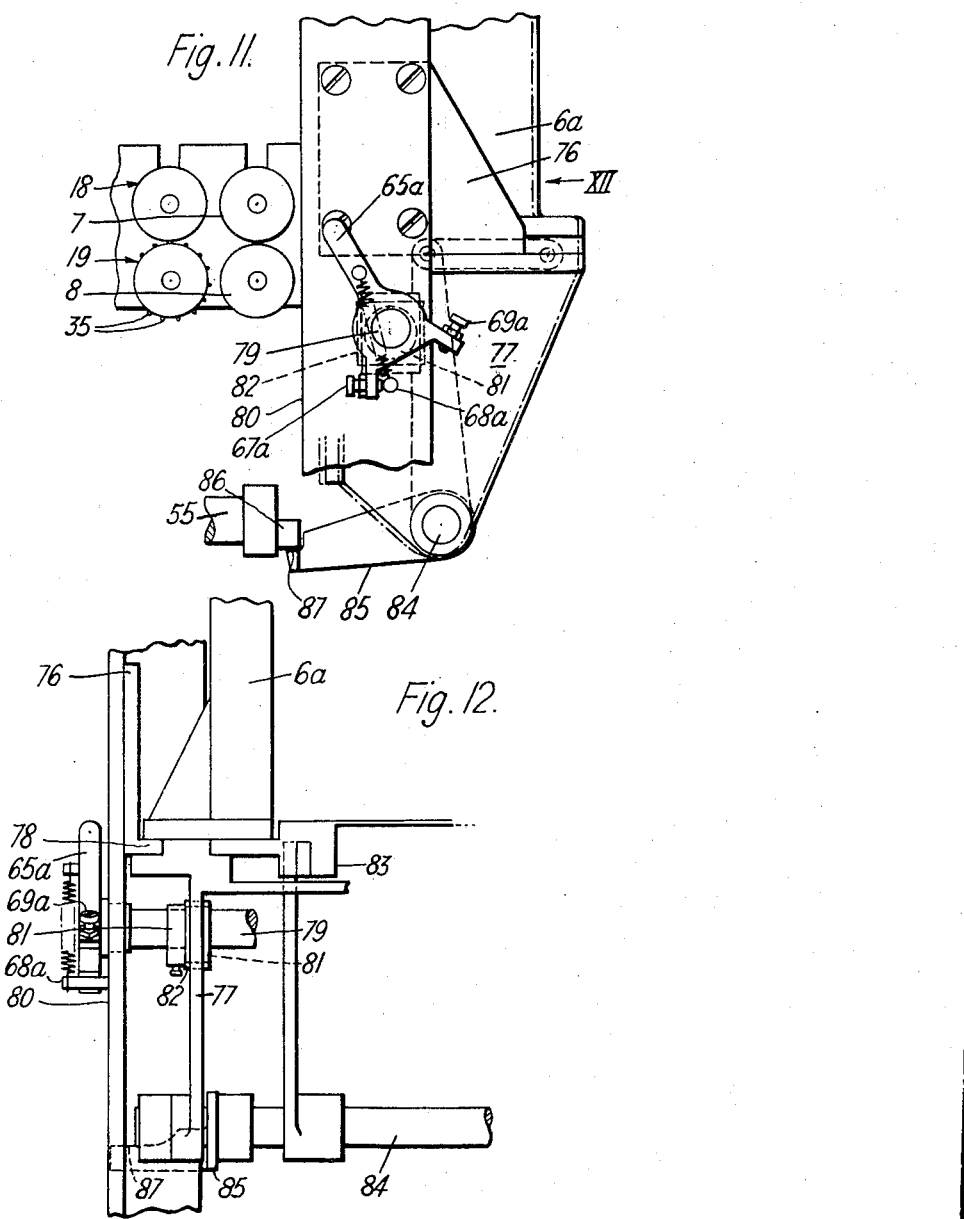

United States Patent Office 2,837,280
Patented June 3, 1958

2,837,280

RECORD CONTROLLED STATISTICAL MACHINES

Richard Everest Baldwin, Coulsdon, England, assignor to Powers-Samas Accounting Machines Limited, London, England, a British company Application September 2, 1955, Serial No. 532,349

Claims priority, application Great Britain August 8, 1955

5 Claims. (Cl. 235—61.11)

This invention relates to record card controlled statistical machines and to apparatus for use therewith for sensing normal or interstage data-indicating positions on moving record cards.

As is well understood in the art a record card is usually sensed either while it is located to be stationary at the sensing position or during continuous movement of the card past the sensing position. When a card remains stationary during sensing it can readily be sensed in either normal or interstage positions thereof by the provision of a suitable stop or stops to retain it in the desired sensing position. However, prior to the present invention, machines in which the card is moved forward continuously during sensing have no means whereby the initial position of presentation of the card to the sensing means may be varied in order that normal or interstage positions of the card can be sensed.

It is a main object of the present invention to provide for a machine in which record cards are to be sensed during continuous movement thereof, a new form of sensing device which will permit the sensing of normal or interstage positions on cards without movement or adjustment of the sensing device thereby ensuring that, when the sensing device has been set up preparatory to performing the sensing of cards, it is thereafter unnecessary to alter the setting thereof irrespective of whether it is to sense normal or interstage card positions.

According to the present invention, apparatus for sensing normal or interstage data-indicating positions on moving record cards comprises feeding means to move a card with a continuous movement during sensing thereof, sensing means to sense data-indicating positions of a card as they are moved in succession past the sensing position, and selectively operable card-locating means disposed at a position in advance of said sensing means and arranged by co-operation with the cards to predetermine whether the card is presented to the sensing means for sensing in normal or interstage positions thereof.

The card-locating means may comprise delivery means to deliver cards in succession to a support located in advance of the sensing means and on which movement of each card is temporarily arrested with the leading edge thereof disposed at a position in advance of the sensing means, a card-feeding member movable into and out of the path of cards delivered to said support to engage the trailing edge of a card arrested on the support and movable after engagement with said trailing edge in a straight-line path to advance the card for engagement thereof by said feeding means to move it past the sensing means for sensing thereby, and selector means to vary the time of entry of said member into the card path and the extent of movement of the member along said straight line path according as to whether normal or interstage row positions of the card are to be sensed.

In one embodiment of the invention the card-feeding member is connected to rocking arms for movement therewith along said path of constant length and to which said member is pivotally connected for movement into and out of said path, and including actuating means operable in timed relation with said delivery means to effect rocking of said arms, and cam elements movable with said arms to co-operate with the card-feeding member during the return stroke and to effect rocking of the member about its pivot thereby to move the member out of said path. The arms may be secured to a rocking shaft rockable by a pivoted lever co-operating with a forked arm secured to the rocking shaft, said lever being pivoted on a normally stationary angularly movable eccentric pivot having a manually operable selector member secured thereto whereby the angular position of the eccentric pivot may be adjusted to one or other of two predetermined positions thereof thereby to predetermine the starting position of said rocking arms and the time of entry of the card-feeding member into said path.

One embodiment of the invention may include card-aligning members mounted on the pivots for said card-feeding member for movement therewith and relative thereto, a spring tending to urge the card-aligning member downwards about said pivots to engage the lateral edges of a card during movement of the card by the card-feeding member thereby to effect lateral alignment of the card for presentation to the sensing position, and a fixed cam located in the path of the card-aligning members to raise them against the action of said spring as the card-feeding member approaches the position of entry thereof into said path.

In order that the invention may be clearly understood one embodiment thereof will now be described, by way of example, with reference to the accompanying diagrammatic drawings in which.

Figure 4A:
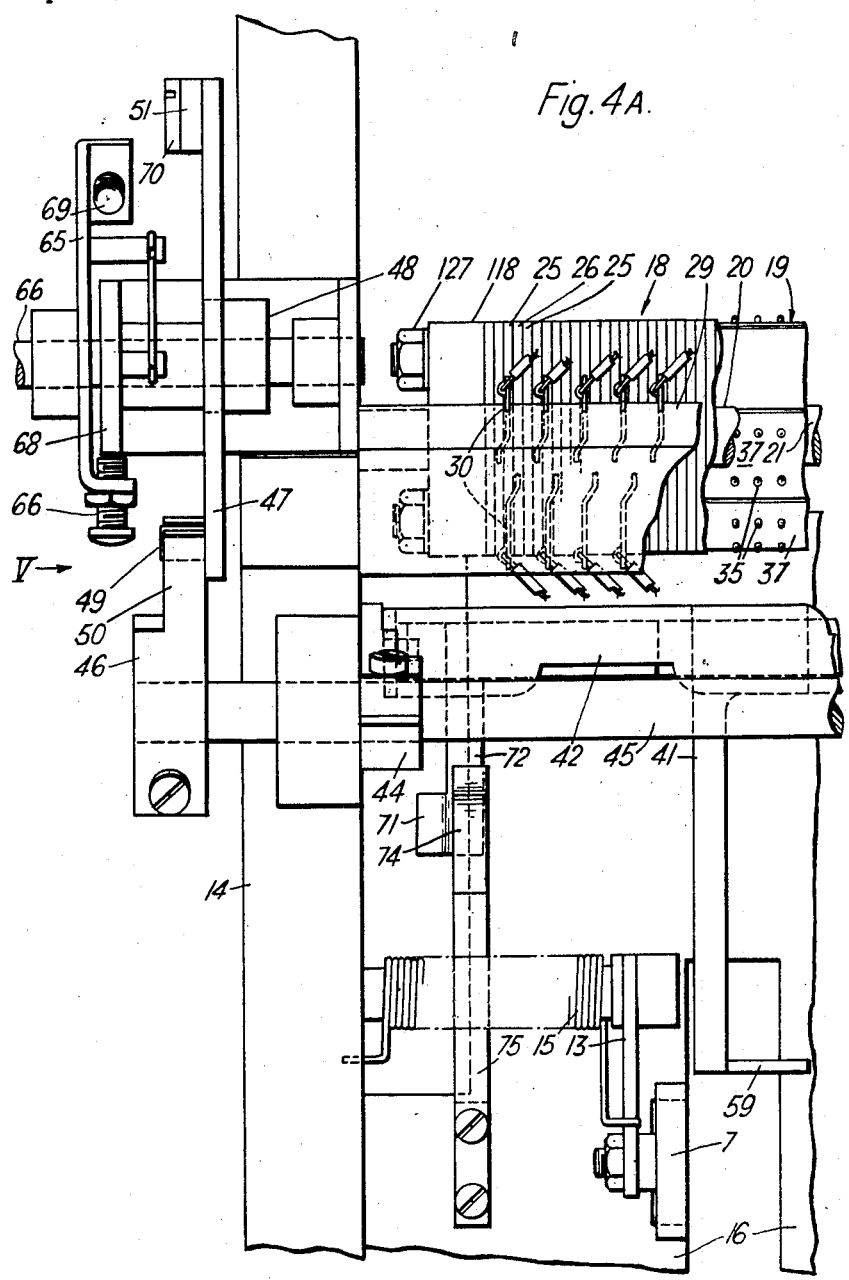
Figure 5:
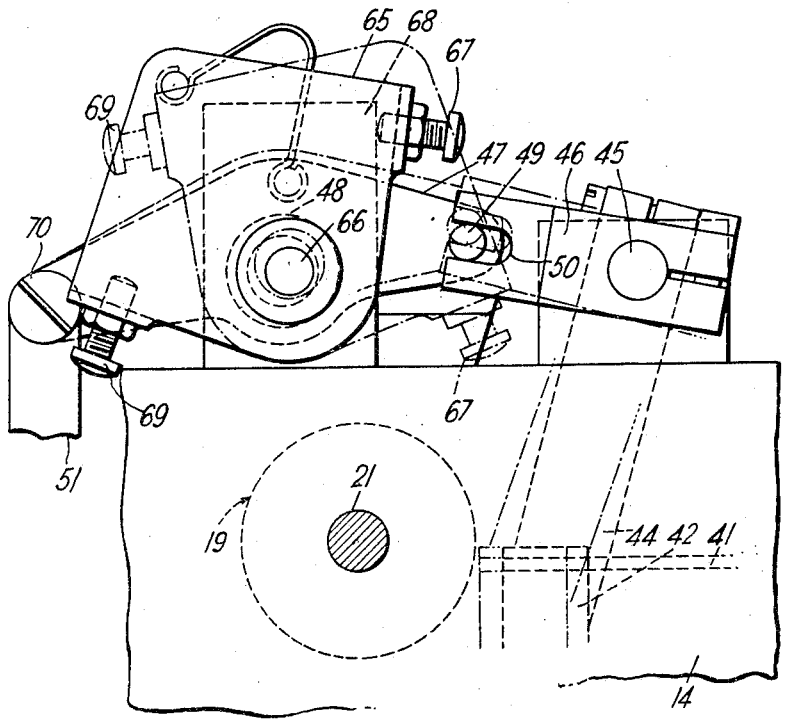

Fig. 3 is a section through a sensing device and apparatus for delivering cards thereto, the section being taken on lines III—III, Fig. 4B, Figs. 4A and 4B are together a broken plan of Fig. 3, Fig. 5 is an elevation, partly in section, looking in the direction of arrow V, Fig. 4A, and shows manually operated mechanism selectively to condition the apparatus to deliver cards to the sensing device either for sensing in normal or for sensing in interstage positions thereof.

Figure 2:
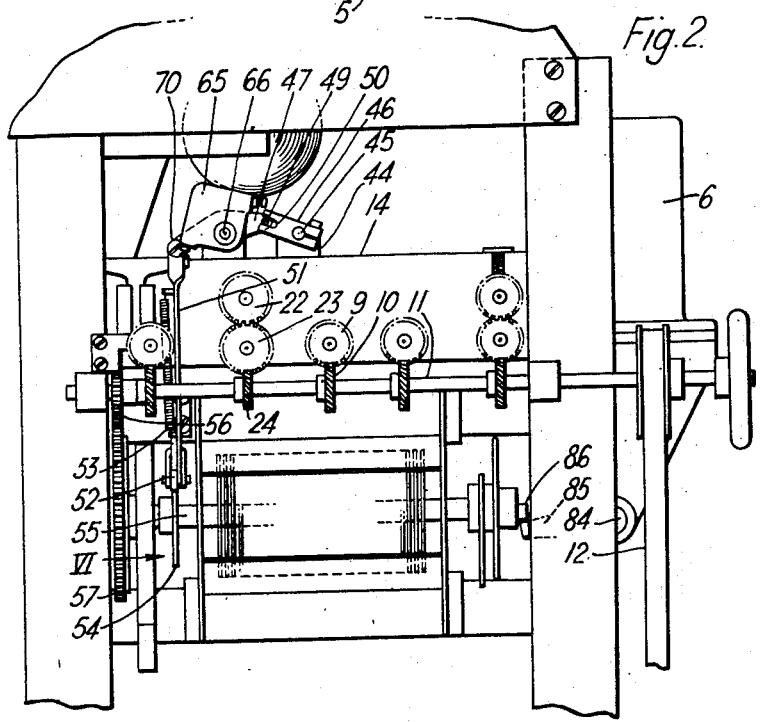
Fig. 2 is a side elevation of a part of a statistical machine having apparatus according to the invention applied thereto.
Figure 6:
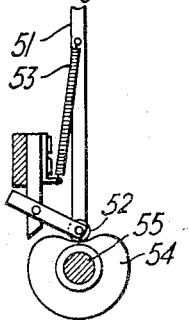

Fig. 6 is a detail looking in the direction of arrow VI, Fig. 2;

Figs. 7 and 8 illustrate the mode of operation of the apparatus to feed cards for sensing in normal positions;

Figs. 9 and 10 illustrate the mode of operation of the apparatus to feed cards for sensing in interstage positions;

Fig. 11 is a side elevation of an alternative device for carrying the invention into effect; and Fig. 12 is an end view of a part of Fig. 11 looking in the direction of arrow XII, Fig. 11.

Figure 1:
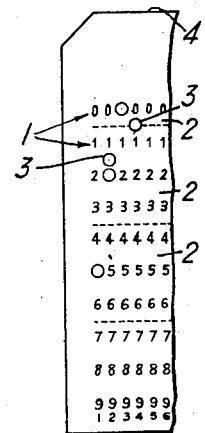
Fig. 1 illustrates a part of a record card.

Referring to the drawings, Fig. 1 illustrate a portion of a record card having vertical columns and horizontal rows in which data can be recorded and, in Fig. 1, data is shown as being recorded by perforations formed in the card. The horizontal row positions 1 are the normal row position on the card and from Fig. 1 it will be seen that, between these row positions, are spaces 2 which are utilized for interstage row positions as shown by the perforations 3.

When a card is fed into the machine the normal leading edge of the card is the edge 4 thereof and the normal trailing edge is the edge 5 thereof. It will be understood that when, as is usual, a card is fed with its leading edge 4 in advance of the trailing edge 5 the normal row positions 1 are presented first to the sensing device and the timing of the card-feeding is such that only the normal rows 1 of the card are sensed. When, however, the card is to be sensed in the interstage positions thereof it must be presented to the sensing device earlier than is the case when normal row positions of the card are to be sensed.

Referring to Figs. 2 to 10 of the drawings, a pile of cards is, as is customary, contained in a magazine 6, Fig. 2, from which the cards are fed one at a time, in known manner, and delivered to feeding means comprising one or more pairs of feeding rollers 7 and 8, Fig. 3, which advance the card towards the sensing position. As shown in Fig. 2, the rollers 8 are positively rotated by gear wheels 9 co-operating with further gear wheels 10 mounted on the main shaft 11 of the machine, which is rotated by a belt 12 in any suitable manner, for example by means of an electric motor, not shown. The rollers 7 are freely rotatable on arms 13, Figs. 3, 4A and 4B, pivoted in machine frames 14 and are urged into engagement with the rollers 8 by springs 15, Figs. 4A and 4B.

The cards issuing from the rollers 7 and 8, Fig. 3, are delivered thereby between a pair of guides 16, 17 of which the guide 17 comprises a support which is located in advance of the sensing position. The card is moved from the support 17 by means to be described below and is delivered to feeding means which move the card with a continuous movement during the sensing thereof. In Fig. 3 the feeding means and the sensing means are formed as a single unit and consist of an upper composite roller 18 and a lower roller 19, the rollers being mounted respectively on rotatable shafts 20, 21 driven in 1:1 ratio by gear wheels 22, 23, Fig. 2, from a gear wheel 24 on main shaft 11. From Fig. 3 it will be seen that the axes of rotation of the rollers 18, 19 are disposed to be vertically one above the other. The upper roller 18 consists of alternate electrically conductive discs 25 and insulating discs 26, Figs. 4A and 4B. The discs 25, 26 are clamped together along the axis of shaft 20 by rods 27, and plates 118 made of insulating material, and nuts 127, Figs. 4A and 4B, the rods 27 being insulated from the discs 25 by insulating sleeves 28. Mounted above the composite roller 18 is a contact-carrying block 29 made of insulating material, supporting a plurality of L-shaped contacts 30, one for each conductive disc 25. The axial spacing of the conductive discs 25 is such that one disc 25 is aligned with each vertical card column to be sensed and the contacts 30 are urged into engagement with the peripheries of the discs 25 by springs 31 housed in block 29. The limbs of the contacts 30 which engage the discs 25 are arranged to extend in opposite directions to provide sufficient space for the connection thereto of electrical leads 32 along which impulses are transmitted when perforations are sensed in a card.

The lower roller 19 is also a composite roller consisting of a portion 33 made from electrically conducting material, such portion being supported at its opposite ends by sleeves 34, Fig. 3, formed from insulating material, the sleeves serving to insulate the roller from the shaft 21. The sleeves 34 are bounded by rings 134 made of electrically conductive material secured to the roller portion 33 and of slightly less diameter than that of the end plates 118 and the rings 134 are so disposed relative to the roller 18 that a card can be nipped between the end plates 118 and the rings 134 to be fed continuously forward thereby during sensing of the card. The portion 33 of the roller 19 is of slightly less diameter than that of the conductive discs 25 so that it does not make contact with the discs.

Around the periphery of the roller 19 are arranged a plurality of columns of sensing pins 35 of which one column is shown in Fig. 3, there being in each column a number of pins 35 corresponding to the number of data-indicating positions in a vertical row of a card. As can be seen from Fig. 3 each sensing pin 35 is located in a recess 36 formed as a slot extending lengthwise of the roller portion 33, the recesses being covered by strips 37 against which shoulders 38 formed on the pins 35 are urged by springs 39 housed in the recesses 36. The tail or inner ends of the pins extend into drilled holes 40 communicating with the recesses 36 so that, if a pin should be depressed axially due to there being no card perforation presented to the pin for sensing, the pin will be depressed against the action of its spring 39. The dimensions of the pins 35 are such that they pass freely into a card perforation without touching the sides of the perforation so that card feeding past the sensing position is effected solely by co-operation between the peripheral portions of the end plates 118 and the rings 134.

It will be understood that the radial sensing pins 35 engage their appropriate card data-indicating positions at a position in advance of the line of contact between the plates 118 and rings 134 and the angular velocity of the rollers 18 and 19 is such that the pins are moved with a linear speed equal to the linear speed of the card. Pins which co-operate with card perforations enter the perforations prior to the perforations being passed between the rollers 18 and 19 and are withdrawn from the perforations after they have passed between the co-operating portions of the rollers. Those pins 35 which pass through data-indicating perforations co-operate with the conductive discs 25 appropriate thereto and during the interval of engagement or possible engagement of a pin with its conductive disc 25 an electrical impulse is applied to the conductive portion 33 of roller 19, in any suitable manner forming no part of the present invention, so that output impulses, as appropriate, pass along the leads 32.

As was mentioned above, a card delivered on to the support 17 remains stationary thereon for a short interval of time before being fed into co-operation with the rollers 18 and 19. A flat spring 139, Figs. 3 and 4B, is provided to retard the forward movement of a card due to the impetus imparted thereto by the rollers 7, 8, so that cards are arrested on the support 17 with their leading edges 4 located at substantially the same distance from the rollers 18, 19.

A card located on the support 17 is moved thereover for engagement by the end plates 118 and rings 134 of rollers 18, 19 by selectively operable card-locating means disposed at a position in advance of the sensing position to predetermine whether the card is presented to the sensing position for sensing in normal or interstage positions thereof. The card-locating means comprises the last pair of rollers 7 and 8, such last pair being the pair illustrated in Fig. 3, and a card-feeding member consisting of two inverted L-shaped arms 41 secured to an inverted U-shaped bracket 42, rockable about pivots 43 carried by rocking arms 44 mounted one each on opposite sides of the machine. The rocking arms 44 are secured to a rocking shaft 45 for angular movement therewith and rocking movement of the shaft 45 is effected by a forked arm 46, Figs. 1, 4A, and 5, secured to shaft 45, a lever 47 pivotally mounted on an eccentric 48, a pin 49 extending laterally from lever 47 and engaging in the fork 50 of arm 46 and a cam operated link 51 pivotally connected to lever 47. The link 51, Figs. 1 5 and 6, carries at its lower end a cam follower 52, Fig. 6, which is urged by a spring 53 into co-operation with a cam 54 secured to a cross shaft 55 driven from the main shaft 11 by co-operating gear wheels 56, 57.

The cam 54 and the link 51 operate to cause the rocking arms 44 to rock through a constant angular distance thereby to move the arms 41 in a straight line path of constant length to effect movement of a card along the support 17 into co-operative relation with the end plates 118 and rings 134 of rollers 18, 19. Figs. 7 and 8 are illustrative of the mechanism when it is pre-set for locating a card relative to the rollers 18, 19 to permit sensing of normal row positions of the card, Fig. 7 illustrating the position of the arms 41 just prior to the commencement of their forward movement in said straight line path of constant length, Fig. 8 illustrating the position of the parts at the instant when the card is initially positively engaged by the end plates 118 and rings 134 to effect feeding of the card. Fig. 3 illustrates the sensing of the first row of the card, the card at this time being fully under position of a card, the card at this time being fully under control of the end plates 118 and sleeves 34 and having been moved thereby away from the arms 41.

The arms 41 are movable into and out of the path of cards delivered to the support 17, being for this purpose moved angularly about their pivots 43. The downwardly depending portions 58 of the arms 41 each have a laterally projecting portion 59, Fig. 4A and 4B, for engagement with the upper surface of the upper guide 16. A spring 60 is anchored at one end of a bracket 61 carried by the inverted U-shaped bracket 42, the other end of the spring being secured to a cam plate 62 secured to the rocking arm 44 for movement therewith. The spring 60 tends at all times to urge the downwardly depending portion 58 of the arms 41 into the path of the cards. Starting from the position thereof shown in Fig. 7, the arms 41 are moved in a straight-line path by the rocking of arms 44 in a clockwise direction, the laterally projecting portions 59 being engaged with the top of the guide element 16 which accordingly constrains the arms 41 to move along their straight-line path. The length of the straight-line path is, of course, determined by the extent of angular movement of rocking arms 44 and when a card is to be sensed in the normal data-indicating positions thereof the card is fed by the downwardly depending portions 58 of the arms 41 to a position at which the leading end of the card is engaged by the co-operating end plates 118 and rings 134 thereby to be moved away from the arms 41 and advanced continuously during the sensing of the card. On reaching the full extent of their forward movement the arms 41 are restored to the starting position thereof by angular movement of the rocking arms 44 in a counter-clockwise direction and during this return movement the laterally projecting portions 59 of arms 41 remain in contact with the upper guide elements 16 due to the action of spring 61 until, just before the arms 41 reach the starting positions thereof, the upwardly extending portion of a bracket 63 secured to the U-shaped member 42 overtakes the cam face 64 of cam plate 62. The engagement of bracket 63 with cam face 64 during continued counter-clockwise movement of rocking arms 44, causes the arms 41 to be raised against the action of spring 60 out of the path of the cards thereby to permit a further card to be fed on to support 17 by the rollers 7, 8. On the next clockwise movement of rocking arms 44, the arms 41 are rocked clockwise due to the action of spring 60 until the depending portions 58 of the arms 41 are again introduced into the path of the cards and are moved into engagement with the trailing edge 5 of a card C which is stationary on support 17.

When the feeding apparatus is to be conditioned to present cards to the rollers 18, 19 for sensing in interstage data-indicating positions, the eccentric 48, Fig. 5, is manually moved clockwise by an operating member 65 secured to the rocking spindle 66 which carries the eccentric 48 and on which the lever 47 is pivoted. As shown in Fig. 5, a stop pin 67 is shown abutting a fixed stop 68 thereby locating the operating member 65 and eccentric 48 in the positions thereof whereby the arms 42 are conditioned to deliver cards to the rollers 18, 19 for sensing in normal row data-indicating positions thereof. By moving the operating member 65 counter-clockwise until a stop 69 carried thereby abuts the edge of the plate 68 opposite that provided to co-operate with the stop 67, the eccentric 48 is rotated clockwise, thus rocking the lever 47 about the pivot 70 by which the lever is connected with link 51 thus raising pin 49 thereby to rock arm 46 and rocking shaft 45 in a clockwise direction so that the downwardly depending portions 58 of the arms 41 will be inserted into the path of the cards, as illustrated in Fig. 9, at a time which is earlier than is the case when the eccentric 48 is set for normal row sensing. Thus, as can be seen from Fig. 9, during interstage sensing operations the portions 58 move in a straight line path which is longer than that in which they move during normal row sensing by a distance C1 which is equal to the pitch between the normal and interstage data-indicating positions of the card; thus a card is introduced by the arms 41, as illustrated in Fig. 10, to the rollers 18, 19 at a time earlier than is the case when the arms 41 are conditioned to feed a card for sensing in the normal row positions thereof. As has been described above, the movement of portions 58 into and out of the card path is controlled by the cam face 64 of cam plate 62 and it will therefore be understood that the modification of the angular position of the cam plate, due to the said clockwise adjustment of eccentric 48, is such that with the device set for interstage row sensing the bracket 63 is engaged with face 64 for a lesser time than is the case when the device is set for normal row sensing so that the portions 58 move in a longer straight line path and correspondingly shorter curved path.

In order to align cards laterally for presentation to the rollers 18, 19, card-aligning members are mounted on the pivots 43 to be movable with the card feeding members 41. The card-aligning members comprise flat plates 71, one for engagement with each end edge of a card, the plates 71 depending from a support 72 carried by a U-shaped bracket 73, Fig. 3, pivoted on the pivots 43. The plates 71 are divergent considered from top to bottom thereof so that as they are rocked clockwise about the pivots 43 they will be moved into engagement with the opposite ends of a card on support 17 and will thereby locate the card laterally for presentation to the rollers 18, 19. The plates 71 are urged in a clockwise direction, as viewed in Fig. 3, by a flat spring 74, Figs. 3 and 4A, and during the return movement of the card feeding members 41, the support 72 for the plates 71 is engaged by an upwardly inclined ramp 75 to be moved thereby in a counter-clockwise direction about the pivots 43 in preparation for the next clockwise movement of arms 44 during which the support 72 will ride down the ramp 75 and, under the action of spring 74, will cause the plates 71 to effect alignment of the card at that time being fed by the card-feeding members 41.

Figs. 11 and 12 illustrate an alternative construction for carrying the invention into effect according to which the card magazine 6a can be selectively positioned to predetermine whether the cards contained therein are presented to the sensing position for sensing in normal or interstage positions thereof. It will be understood that as the cards to be sensed are contained as a pile in the magazine, the magazine is arranged for co-operation with the cards and it is disposed at a position in advance of the sensing position.

The magazine 6a is slidable from left to right, as viewed in Fig. 11, on a bracket 76 fixed to the frame of the machine. Movable with the magazine 6a is a frame 77 which forms with the magazine 6a a slot or groove for sliding co-operation with inwardly directed flanges 78, Fig. 12, on the brackets 76. A rock shaft 79 is journalled in the machine frame 80 to which the fixed frame 76 is secured and eccentrics 81 are secured to shaft 79 and are housed in square blocks 82 slidable in a vertical direction in slots formed in the frame 77.

The magazine is provided with a slide 83, Fig. 12, which carries the usual card-picker elements, not shown, the slide 83 being reciprocable, in known manner, by rocking of a rocking shaft 84 journalled in the frame 77. Rocking of the shaft 84 is effected, in known manner, by an arm 85 secured thereto and an operating member 86 which effects rocking of the arm 85 by co-operation with a step 87 formed therein.

As illustrated in full lines in Fig. 11, the parts are shown in the positions thereof to permit feeding the cards for sensing in normal row positions thereof and when located in this position an operating elements 65a is so located that a first stop 67a is engaged with a fixed stop 68a. When it is desired to move the magazine to the position thereof, as indicated in chain line in Fig. 11, at which cards will be fed therefrom for presentation to the rollers 18, 19 for sensing in interstage data-indicating positions thereof, the operating member 65a is moved clockwise until a second stop 69a carried thereby is moved into engagement with the fixed stop 68a, the eccentrics 81 thereby being moved angularly to effect movement of the magazine 6a and frame 77 by a predetermined distance to the left, as viewed in Fig. 11, so that the frame occupies the position indicated in chain-line at the right of Fig. 11. It will be understood that the operating member 86 does not move relative to the fixed frame 80, but the step 87 on arm 85 is moved relative thereto while being kept always in engagement therewith as the frame 77 is moved from one position to the other position thereof. Cards, as they issue from the magazine 6a, are received by feed rollers 7, 8 and are delivered thereby to the rollers 18, 19.

It will be understood that although radial pins 35 have been described herein as the means for sensing cards, other means, such as fixed electrical brushes, may be employed for card sensing.

I claim:

1. Apparatus for sensing normal or interstage data-indicating positions on moving record cards, comprising feeding means to move a card with a continuous movement during sensing thereof, sensing means to sense data-indicating positions of a card as they are moved in succession past the sensing position, a card support located in advance of the sensing means, delivery means to deliver cards in succession to a position on the support at which each card is temporarily arrested with the leading edge thereof disposed at a position in advance of the sensing means, a card-feeding member movable into and out of the path of cards delivered to said support to engage the trailing edge of a card arrested on the support and movable after engagement with said trailing edge in a straight line path to advance the card for engagement thereof by said feeding means to move it past the sensing means for sensing thereby, and selector means to vary the time of entry of said member into the card path and the extent of movement of the member along said straight path according as to whether normal or interstage row positions of the card are to be sensed.

2. Apparatus according to claim 1, wherein the card-feeding member is connected to rocking arms for forward and return movement therewith along said path of constant length and to which said member is pivotally connected for movement into and out of said path, and including actuating means operable in timed relation with said delivery means to effect rocking of said arms, and cam elements movable with said arms to co-operate with the card-feeding member during the return stroke thereof to effect rocking of the member about its pivot thereby to move the member out of said path.

3. Apparatus according to claim 2, wherein said arms are secured to a rocking shaft rockable by a pivoted lever co-operating with a forked arm secured to the rocking shaft, said lever being pivoted on a normally stationary angularly movable eccentric pivot having a manually operable selector member secured thereto whereby the angular position of the eccentric pivot may be adjusted to one or other of two predetermined positions thereof thereby to predetermine the starting position of said rocking arms and the time of entry of the card-feeding member into said path.

4. Apparatus according to claim 3, including card-aligning members mounted on the pivots for said card-feeding member for movement therewith and relative thereto, a spring tending to urge the card-aligning members downwards about said pivots to engage the lateral edges of a card during movement of the card by the card-feeding member thereby to effect lateral alignment of the card for presentation to the sensing position, and a fixed cam located in the path of the card-aligning members to raise them against the action of said spring as the card-feeding member approaches the position of entry thereof into said path.

5. Apparatus for sensing normal or interstage data-indicating positions on moving record cards, comprising feeding means to move a card with a continuous movement during sensing thereof, sensing means to sense data-indicating positions of a card as they are moved in succession past the sensing position, a card support by which a card is supported in a stationary condition thereof with its leading edge in advance of the sensing means, a card-feeding member adapted to engage the trailing edge of a card carried by the support and to move the card from the support for presentation to said feeding means, and selector means co-operating with said card feeding member to vary the time of presentation of a card to said feeding means according as to whether normal or interstage row positions of the card are to be sensed.

No references cited.